United States Patent
Iyengar et al.

(10) Patent No.: US 9,727,671 B2
(45) Date of Patent: Aug. 8, 2017

(54) METHOD, SYSTEM, AND PROGRAM STORAGE DEVICE FOR AUTOMATING PROGNOSTICS FOR PHYSICAL ASSETS

(71) Applicant: General Electric Company, Schenectady, NY (US)

(72) Inventors: Satish Giridhar Iyengar, Niskayuna, NY (US); John Anderson Fergus Ross, Niskayuna, NY (US); Frederick Wilson Wheeler, Niskayuna, NY (US); Naresh Sundaram Iyer, Ballson Spa, NY (US); Paulo Ricardo dos Santos Mendonca, Niskayuna, NY (US); Ashok Sundaresan, Niskayuna, NY (US); Yujiao Zheng, Syracuse, NY (US)

(73) Assignee: General Electric Company, Schenectady, NY (US)

( * ) Notice: Subject to any disclaimer, the term of this patent is extended or adjusted under 35 U.S.C. 154(b) by 346 days.

(21) Appl. No.: 14/632,780

(22) Filed: Feb. 26, 2015

(65) Prior Publication Data
US 2016/0253440 A1 Sep. 1, 2016

(51) Int. Cl.
G06F 17/50 (2006.01)
G01R 31/36 (2006.01)

(52) U.S. Cl.
CPC ...... *G06F 17/5009* (2013.01); *G01R 31/3651* (2013.01)

(58) Field of Classification Search
USPC .......... 703/2, 5, 7; 700/10; 706/45
See application file for complete search history.

(56) References Cited

U.S. PATENT DOCUMENTS

| | | | | |
|---|---|---|---|---|
| 7,203,431 B2* | 4/2007 | Shoji | ............... | G06F 11/0754 399/9 |
| 7,539,599 B2* | 5/2009 | Hasegawa | ............. | G03G 15/55 700/10 |
| 7,581,434 B1* | 9/2009 | Discenzo | ........... | G01N 33/2888 73/53.01 |
| 8,332,342 B1* | 12/2012 | Saha | ................ | G01R 31/3651 706/45 |
| 2005/0157327 A1* | 7/2005 | Shoji | ................ | G06F 11/0754 358/1.14 |

* cited by examiner

*Primary Examiner* — Thai Phan
(74) *Attorney, Agent, or Firm* — Schwegman Lundberg & Woessner, P.A.

(57) ABSTRACT

In an example embodiment, a method of calculating end-of-life (EOL) predictions for a physical asset is provided. A state-space model for the physical asset is obtained, the state-space model being a physics-based model describing a state of the physical asset at a particular time given measurements or observations for the physical asset. Then a current state of the physical asset is inferred. Then a long-term prediction is derived for the physical asset based on the inferred current state of the physical asset and the state-space model for the physical asset. Then an EOL probability distribution function is generated for the physical asset based on the long-term prediction, the EOL probability distribution function describing a range of estimates of EOL for the physical asset and their corresponding confidence intervals.

20 Claims, 15 Drawing Sheets

STATE EQUATION

605

$$x_k = \sum_{i=1}^{I} \underbrace{w_i p_i(x_{k-1}; \theta_i)}_{\text{DATA-DRIVEN MODEL}} + \underbrace{w_p f_{\text{phy}}(x_{k-1}; \theta_p)}_{\text{APPROX. PHYSICS-BASED MODEL}}$$

RBFS (E.G., GAUSSIAN KERNELS)

MEASUREMENT EQUATION

610

$$y_k = \sum_{j=1}^{J} \underbrace{w_j p_j(x_{k-1}; \theta_j)}_{\text{DATA-DRIVEN MODEL}} + \underbrace{w_q h_{\text{phy}}(x_k; \theta_q)}_{\text{APPROX. PHYSICS-BASED MODEL}}$$

Figure 6

|  | EOL ESTIMATE | 95% CONFIDENCE INTERVAL (LOWER) | 95% CONFIDENCE INTERVAL (UPPER) |
|---|---|---|---|
| DATA-DRIVEN MODELING (SAME UNIT) | 97.23 | 81.75 | 138.80 |
| DATA-DRIVEN MODELING (ANALOGOUS UNITS) | 98.37 | 84.20 | 131.7 |
| PHYSICS-BASED MODEL | 99.51 | 83.01 | 139.80 |

Figure 11

METHOD, SYSTEM, AND PROGRAM STORAGE DEVICE FOR AUTOMATING PROGNOSTICS FOR PHYSICAL ASSETS

TECHNICAL FIELD

The subject matter disclosed herein generally relates to the processing of data. In some example embodiments, the present disclosure relates to methods and systems for automating prognostics for physical assets.

BACKGROUND

Prognostics refers to the study or discipline of predicting end-of-life (EOL) of a system or a component of a machine, referred to herein as an asset or industrial asset. Some examples of such assets include gas turbines, consumer items, automobiles, automobile parts, etc. EOL refers to the time when the system or the component will no longer perform its intended function. In conventional systems, known techniques, such as Bayesian filtering techniques, have been able to predict the remaining useful life of assets. However, conventional methods require that the exact model that captures the system dynamics be known. This requirement is hardly met in practice, due to non-linearities in real-life assets and the complexities of machines currently being manufactured.

BRIEF DESCRIPTION OF THE DRAWINGS

Some embodiments are illustrated by way of example and not limitation in the figures of the accompanying drawings.

FIG. 6 is a diagram depicting the equation for describing a state of the asset as well as a measurement equation for determining or tracking the current state of the asset in accordance with an example embodiment.

FIG. 11 is a chart depicting a comparison of EOL estimates between the original unit and an analogous unit, in accordance with an example embodiment.

DETAILED DESCRIPTION

Figure 1:
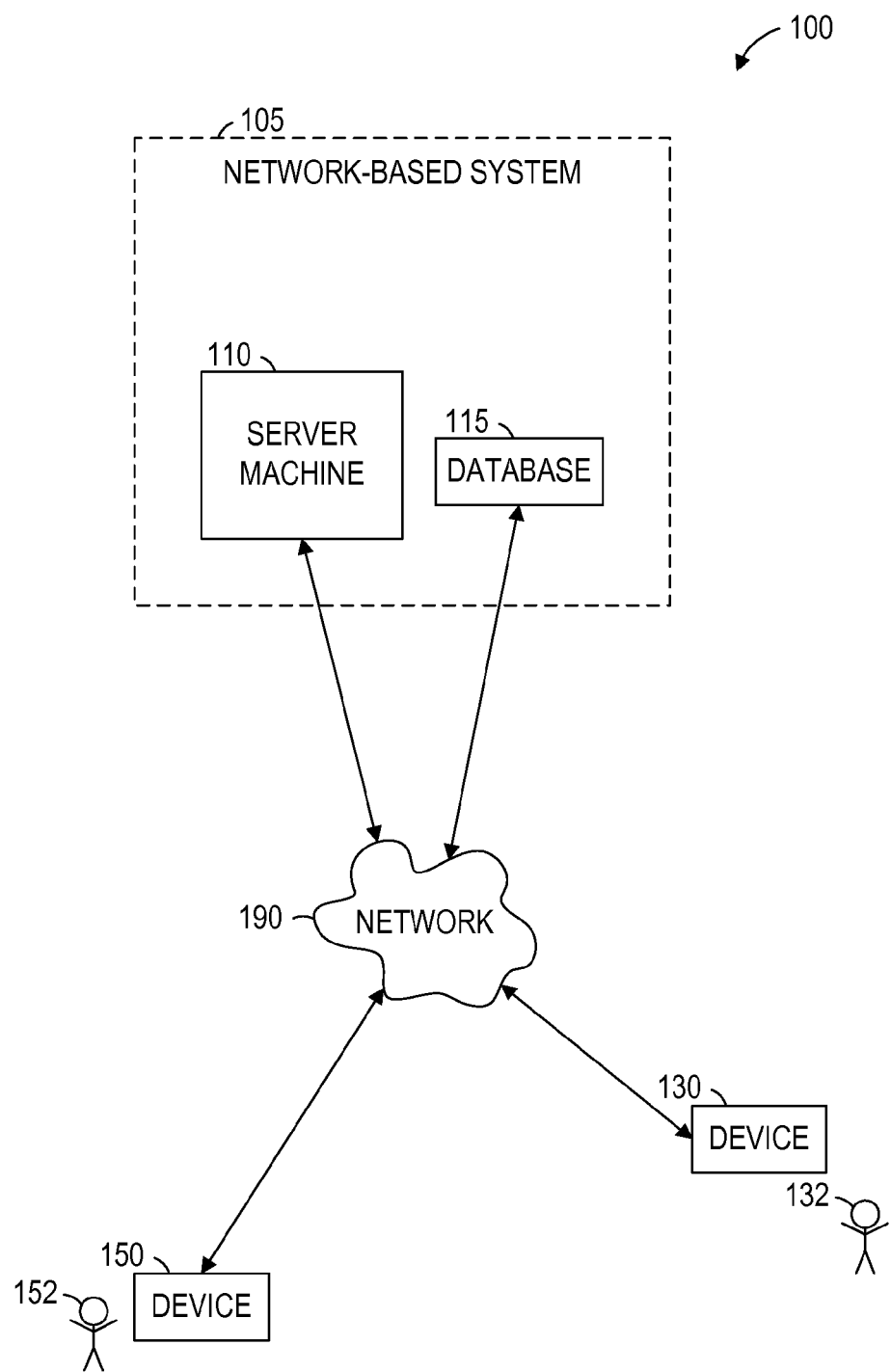
FIG. 1 is a block diagram illustrating a system, in accordance with an example embodiment, for performing automated prognostics.

Example methods, apparatuses, systems and non-transitory machine readable mediums are presented for automating prognostics for industrial assets. Aspects of the present disclosure allow for automated prognostics for industrial assets by automatically constructing dynamical models of the asset from empirical training data. An integrated system capable of monitoring and estimating an asset's EOL is described. A unified modeling framework is provided that allows physics-based, data driven, or a combination of both types of modeling. Further, in some cases a model that approximates the underlying physics of an asset to a certain extent is available. In these cases, in some example embodiments, the approximate physics-based model can be augmented with information extracted from training data to make more accurate EOL predictions. Aspects of the present disclosure can accomplish this by constructing a hybrid state-space model that is a combination of the data-driven and the user-specified approximate models, thus leveraging the strengths of both the data-driven and the physics-based approaches. Aspects of the present disclosure also allow the use of data collected from an entire fleet of similar assets to be monitored. The model learned from the fleet-wide data can provide a universal model for representing asset dynamics, which can then be rendered unit-specific by the model adaptation feature. Using model adaptation according to some example embodiments, parameters of the average model can be automatically tuned as new measurements from the asset being monitored become available. In addition, in some cases, data from failed assets can also be incorporated while training to develop a better universal model. One can also upgrade the universal model based on EOL data from other assets. The technical effect is to improve the reliability of EOL predictions for physical assets and thus improve management of the physical assets, allowing, for example, adequate replacement parts to be on hand for failures while not maintaining excess parts inventory.

In an example embodiment, the model is a state-space model with state and measurement equations given by a weighted combination of Radial Basis Functions (RBFs). The weights and parameters of the model are learned from data provided by the user. In an example embodiment, in addition to providing a point estimate of the EOL, the system also outputs the uncertainty around the point estimate in terms of a confidence interval. The user can also specify a physics-based state-space model if available that describes the asset's operation. This model will then be used by the system along with the observed measurements to track and make long-term predictions regarding the health of the system. When such a model is unavailable, the system has the in-built capability of automatically employing system identification techniques to construct a state-space model that adequately characterizes the asset's operation and dynamics using the training data provided. EOL predictions are then made using the model thus constructed.

In an example embodiment, in order to mitigate the computation complexity involved when performing both system identification and health predictions, these process will be carried out on multiple nodes in a cloud. In addition, the system also allows the user to specify approximate and simpler physics-based models that are able to capture the dynamics only to a certain extent. The system then combines the approximate physics-based model and the model learned from training data to construct a hybrid model. The developed hybrid model is then used to track the asset's health and estimate its EOL probability distribution at future instants of interest. As a useful byproduct, the estimation procedure also outputs a number which quantifies the accuracy of the supplied physics-based model. Additionally, in an example embodiment, the user-specified model or model learned using training data can be adapted to account for changes in the operational pattern of a specific asset or when the system is deployed to another unit.

FIG. 1 is a block diagram illustrating a system 100, in accordance with an example embodiment, for performing automated prognostics. The system 100 includes a server machine 110, a database 115, a first device 130 for a first user 132, and a second device 150 for a second user 152, all communicatively coupled to each other via a network 190. The server machine 110 can form all or part of a network-based system 105 (e.g., a cloud-based server system configured to provide one or more services to the devices 130 and 150). The database 115 can store data relevant to generating EOL predictions, such as system specifications about assets, physics models of assets, statistics about machines related to various assets, and the like. The server machine 110, the first device 130, and the second device 150 can each be implemented in a computer system, in whole or in part, as described below with respect to FIGS. 2 and/or 15.

Also shown in FIG. 1 are users 132 and 152. One or both of the users 132 and 152 can be a human user, a machine user (e.g., a computer configured by a software program to interact with the device 130), or any suitable combination thereof (e.g., a human assisted by a machine or a machine supervised by a human). The user 132 can be associated with the device 130 and can be a user of the device 130. For example, the device 130 can be a desktop computer, a vehicle computer, a tablet computer, a navigational device, a portable media device, a smartphone, or a wearable device (e.g., a smart watch or smart glasses) belonging to the user 132. Likewise, the user 152 can be associated with the device 150. As an example, the device 150 can be a desktop computer, a vehicle computer, a tablet computer, a navigational device, a portable media device, a smartphone, or a wearable device (e.g., a smart watch or smart glasses) belonging to the user 152.

Any of the machines, databases, or devices shown in FIG. 1 can be implemented in a general-purpose computer modified (e.g., configured or programmed) by software (e.g., one or more software modules) to be a special-purpose computer to perform one or more of the functions described herein for that machine, database, or device. For example, a computer system able to implement any one or more of the methodologies described herein is discussed below with respect to FIG. 15. As used herein, a "database" can refer to a data storage resource and can store data structured as a text file, a table, a spreadsheet, a relational database (e.g., an object-relational database), a triple store, a hierarchical data store, any other suitable means for organizing and storing data or any suitable combination thereof. Moreover, any two or more of the machines, databases, or devices illustrated in FIG. 1 can be combined into a single machine, and the functions described herein for any single machine, database, or device can be subdivided among multiple machines, databases, or devices.

The network 190 can be any network that enables communication between or among machines, databases, and devices (e.g., the server machine 110 and the device 130). Accordingly, the network 190 can be a wired network, a wireless network (e.g., a mobile or cellular network), or any suitable combination thereof. The network 190 can include one or more portions that constitute a private network, a public network (e.g., the Internet), or any suitable combination thereof. Accordingly, the network 190 can include, for example, one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 190 can communicate information via a transmission medium. As used herein, "transmission medium" can refer to any intangible (e.g., transitory) medium that is capable of communicating (e.g., transmitting) instructions for execution by a machine (e.g., by one or more processors of such a machine), and can include digital or analog communication signals or other intangible media to facilitate communication of such software.

Figure 2:
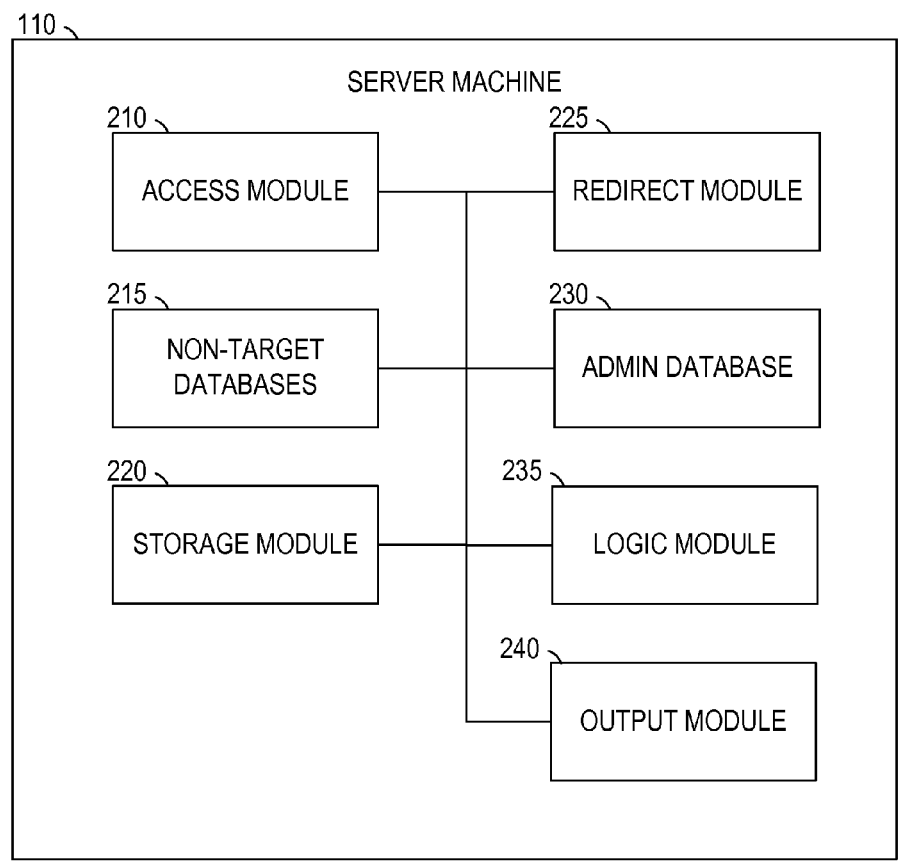
FIG. 2 is a block diagram illustrating a server machine, in accordance with an example embodiment, for generating automated prognostics.

FIG. 2 is a block diagram illustrating a server machine 110, in accordance with an example embodiment, for generating automated prognostics. The server machine 110 is shown as including an access module 210, one or more non-target databases 215, a storage module 220, a redirect module 225, an admin database 230, a logic module 235, and an output module 240, all configured to communicate with each other (e.g., via a bus, shared memory, or a switch). Any one or more of the modules and databases described herein can be implemented using hardware (e.g., one or more processors of a machine) or a combination of hardware and software. For example, any module or database described herein can configure a processor (e.g., among one or more processors of a machine) to perform the operations described herein for that module or database. Moreover, any two or more of these modules can be combined into a single module, and the functions described herein for a single module can be subdivided among multiple modules. Furthermore, according to various example embodiments, modules described herein as being implemented within a single machine, database, or device can be distributed across multiple machines, databases, or devices.

The access module 210 can be configured to interface with a client, such as user 132 or 152 through device 130 or 150 via network 190. The storage module 220 can be configured to store data in the server machine 110. In some cases, the non-target database(s) 215 can be stored in the storage module 220. The redirect module 225 can be configured to switch contexts between one database and another. In some cases, the redirect module 225 can redirect the client's interface from no database in the server machine 110 to another database residing on a different server in the network-based system 105. The admin database 230 can be a database that resides on each server in the network-based system 105, and can be configured to keep track of the locations of each database in the network-based system 105.

In some cases, the admin database 230 can also verify whether a particular database called by the client is configured to be auto-started or not. The logic module 235 can reside in the admin database 230, and can be configured to run a procedure that determines whether the target database 115 resides on the server machine 110. In some cases, the logic module 235 can be accessed through the admin database 230 without actually connecting to the admin database 230. The output module 240 can be configured to display or otherwise present data and other information to the client through the server machine 110 and other display means, not shown. In some cases, the output module 240 can be configured to transmit text and other data to a display module, which can reside in another device, such as device 130 or 150.

Still referring to FIG. 2, the target server 110 can include its own separate access module 210, storage module 220, redirect module 225, and output module 240, each of which can be configured to operate in similar manners described with respect to the server machine 110. The target server 110 however, contains the target database 115 that is the database intended to be accessed by the client. The client may not know that the target database 115 resides in the target server 110 and the target database 115 may not be active or spawned before the client requests to access it. Thus, in some cases, the target server 110 and the server machine 110 are one and the same. In some cases, the target database 115 is stored in the storage module 220. The target server 110 also can contain its own copy of the admin database 230, also including the logic module 235 that is configured to perform the same logic as in the server machine 110. In some cases, all of the copies of the admin database 230 residing on each of the plurality of servers in the network-based system 105 are synced together, in that changes made to any copy of the admin database 230 on any of the servers will be propagated to all the copies of the admin database 230 on all the other servers. Thus, in some cases, running an admin database 230 on one server can allow the network-based system 105 to switch contexts from the one server to another server while still running the admin database 230 on the other server.

Figure 3:
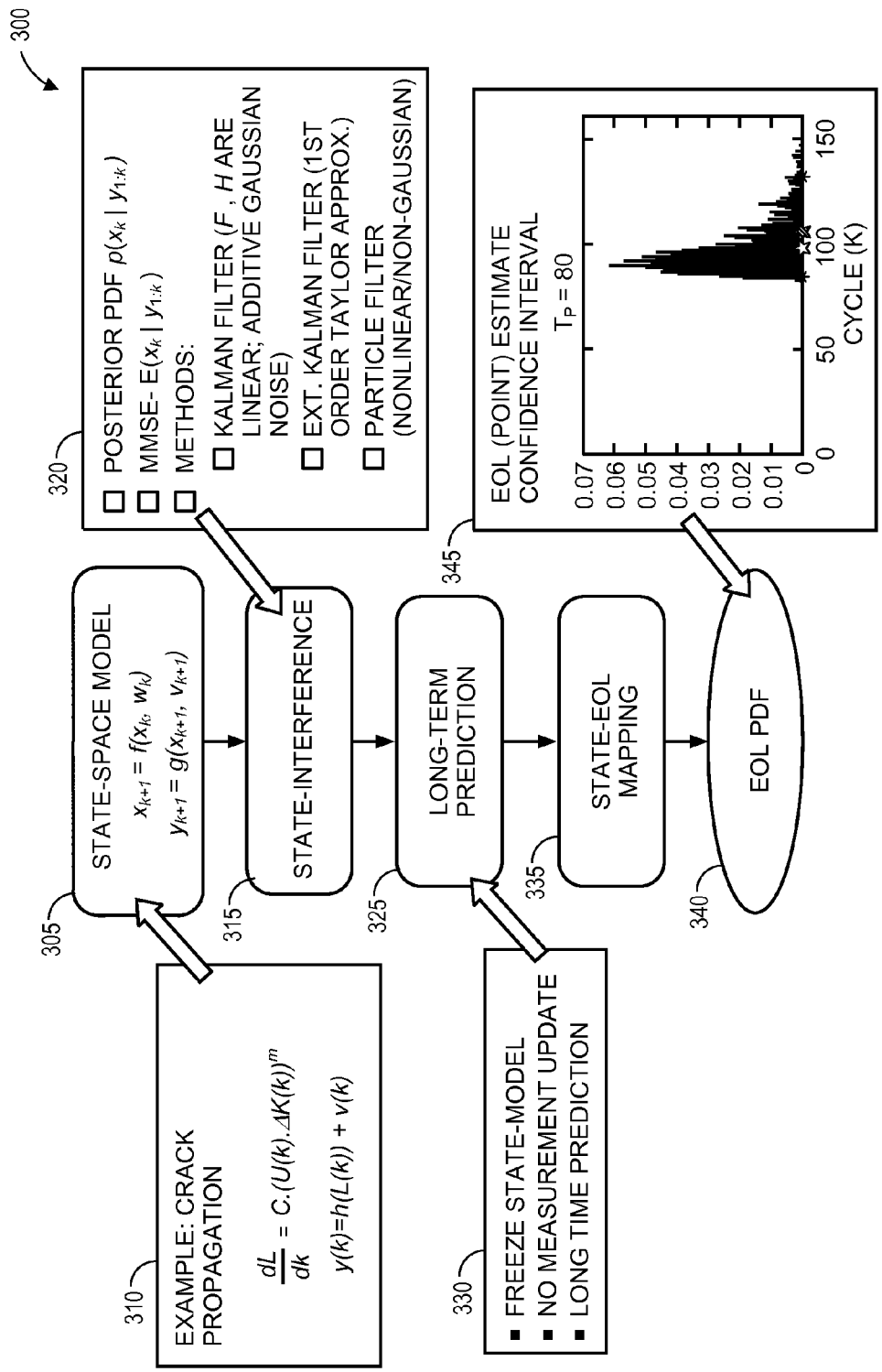
FIG. 3 is a flow diagram illustrating a method, in accordance with an example embodiment, for generating end-of-life (EOL) predictions of an industrial asset.

FIG. 3 is a flow diagram illustrating a method 300, in accordance with an example embodiment, for generating end of life (EOL) predictions of an industrial asset. The described example process can be implemented by, for example, the network-based system 105 of FIG. 1. The method 300 is applicable to EOL predictions where the physics model for the asset is known. For example, starting at block 305, a state-space model can already be known or predefined. In this example $x_k$ is the state of the asset at time k, $y_k$ are measurements or observations received at time k, $w_k$ is a noise term in the state equation at time k, $v_k$ is a noise term in the measurement equation, $f$ is a function describing state propagation, and g is a function describing the relationship between the state and the observations.

An example set of equations defining the state-space model is shown in window 310, describing crack propagation in an industrial asset. In this example, crack propagation is explained using Paris' equation, where L is the total crack length, C and m are material related coefficients, k is the cycle index, U(k) is a parameter vector that models the effect of crack closure during cycle k and $\Delta K(k)$ is the crack tip stress variation during the cycle k, measured in $(MN/m^{3/2})$.

y(k)=h(L(k))+v(k) is a measurement equation, where y(k) is a noisy sensor measurement obtained at cycle 'k' which is related to the crack length by the nonlinear function h(.). v(k) is the noise term.

Next, at block 315, the method 300 includes determining or estimating the state of the industry asset within the state-space model. Example mechanisms for inferring the state are described in window 320. These examples include a posterior probability distribution function (PDF) $p(x_k|t_{1:k})$, the expected value of the state at time k given observations until time k $E(x_k|y_{(1:k)})$, using a Kalman filter, or an extended Kalman filter, or a particle filter.

Then, at block 325, a long-term prediction can be made about the state (health) of an industrial asset. In the crack propagation example, this would be equivalent to predicting how cracks might propagate. Window 330 describes the steps involved in making long-term predictions wherein the estimate of the current state of the asset (obtained using a Bayesian filter) is projected to future time instants using the state equation. At block 335, the method 300 includes mapping each state in the state-space model to end-of-life predictions. Out of this, at oval 340, an end-of-life PDF can be generated. An example graph of an EOL PDF is shown in window 345.

In an example embodiment, in the case that no state-space model has been determined or provided, a process may be provided to deduce a state-space model for the asset. This deduced state-space model can then be fed into the method 300 of FIG. 3.

Figure 4:
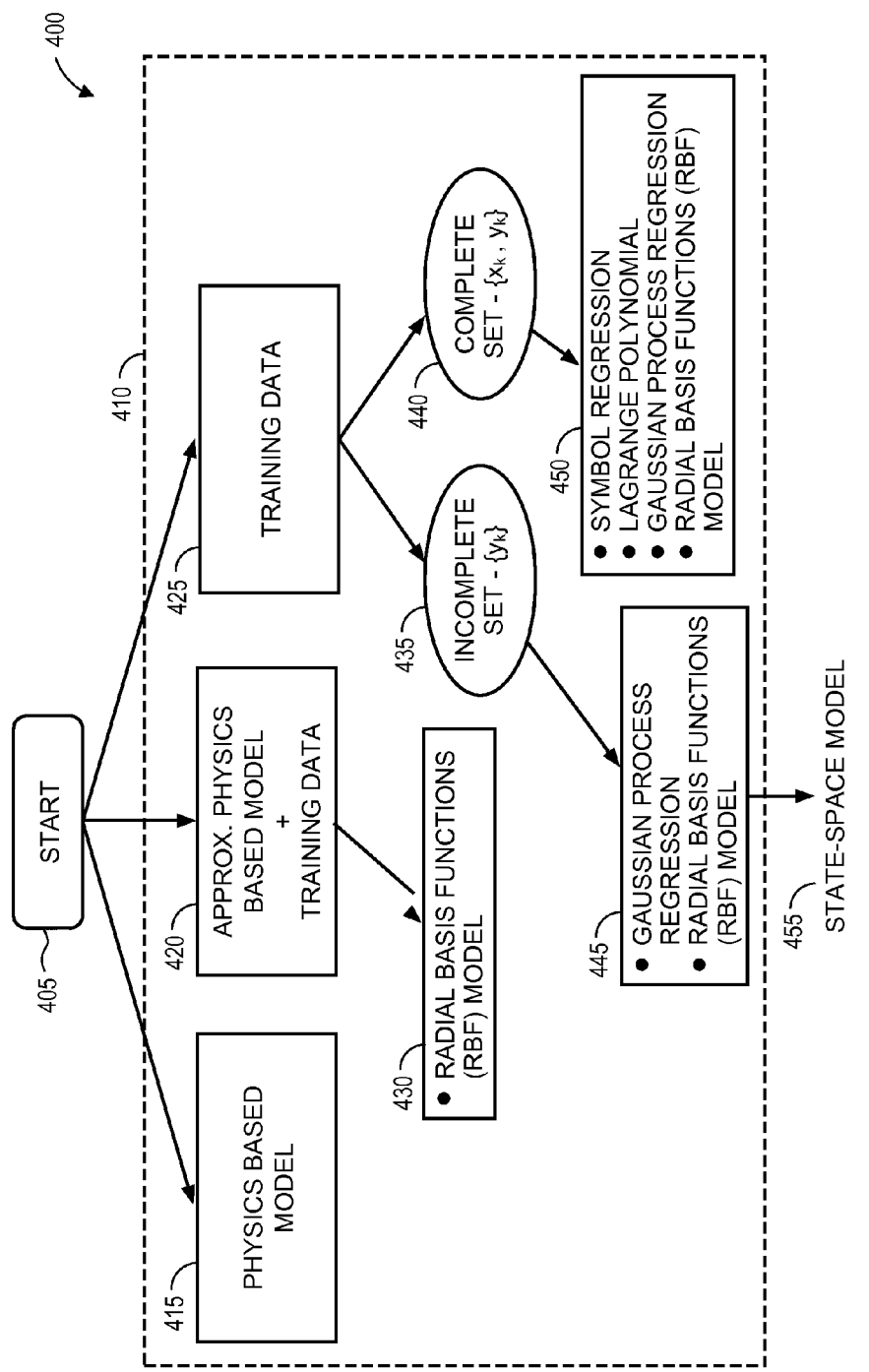
FIG. 4 is a flow diagram illustrating a method, in accordance with an example embodiment, for building a state-space model that characterizes the asset's operation and dynamics using training data provided.

FIG. 4 is a flow diagram illustrating a method 400, in accordance with an example embodiment, for building a state-space model that characterizes the asset's operation and dynamics using the training data provided. Beginning at start block 405 and proceeding into box 410, the example method 400 can develop the state-space model depending on the information about the physics of the asset operation and the kind of training data about the industrial asset. For example, if a complete physics-based model about the industrial asset is known, then the example method 400 can proceed to block 415. The process for generating an EOL prediction in block 415 can be consistent with the processes described in FIG. 3. However, it can often be the case that a complete physics-based model is not known. In these cases, the EOL prediction can rely on the model constructed using the training data about the industrial asset. Thus, in some cases, an EOL prediction can be generated using the model learnt from only training data, at block 425. If a complete set of training data is available, then the example method 400 can proceed to oval 440. A 'complete' set here refers to the availability of both the state and sensor measurements that can be used for training/state-space model building. Example mechanisms for building state-space models using a complete set of training data are shown in block 450, and include symbolic regression, Gaussian Process Regression, and an RBF model. The example mechanisms in block 450 include different types of mathematical techniques that can process the complete set of training data in order to construct state-space models that characterize the operational dynamics and health of the asset.

In other cases, if an incomplete set of training data is available, the example method 400 can proceed to oval 435, where example mechanisms for constructing state-space models in this situation are shown at block 445. 'Incomplete' set here refers to the cases where the state measurements are unavailable for model construction, or if some states are known but not all. For the crack propagation example, it may be that training data is comprised of only measurements from vibration sensors but not the actual crack dimensions. Aspects of the present disclosure allow for state-space model construction and subsequently EOL predictions to be made with an incomplete set of training data. This scenario proceeds to block 445 as shown. The structure of the model constructed using the incomplete dataset can be a weighted combination of radial basis functions (RBFs) as shown in block 445. In some cases, approximate physics-based models might be available. Aspects of the present disclosure can then leverage the physics-based model along with the training data to construct a hybrid model that is a more accurate representation of the asset's behavior. This scenario proceeds to block 420, as shown. In some cases, the structure of this hybrid model is a weighted combination of RBFs (see block 430) and the approximate physics-based model. The parameters of the state-space model can be estimated using expectation-maximization (EM) techniques. In the case of the hybrid model, the estimated weight corresponding to the physics-based model can also indicate or quantify its accuracy, which could be valuable information to the user.

Based on all of these scenarios, the resulting outcome is a state-space model 455. The state-space model can now be used to first describe the current state of the industrial asset, as well as generate EOL predictions based on the current state.

Figure 5:
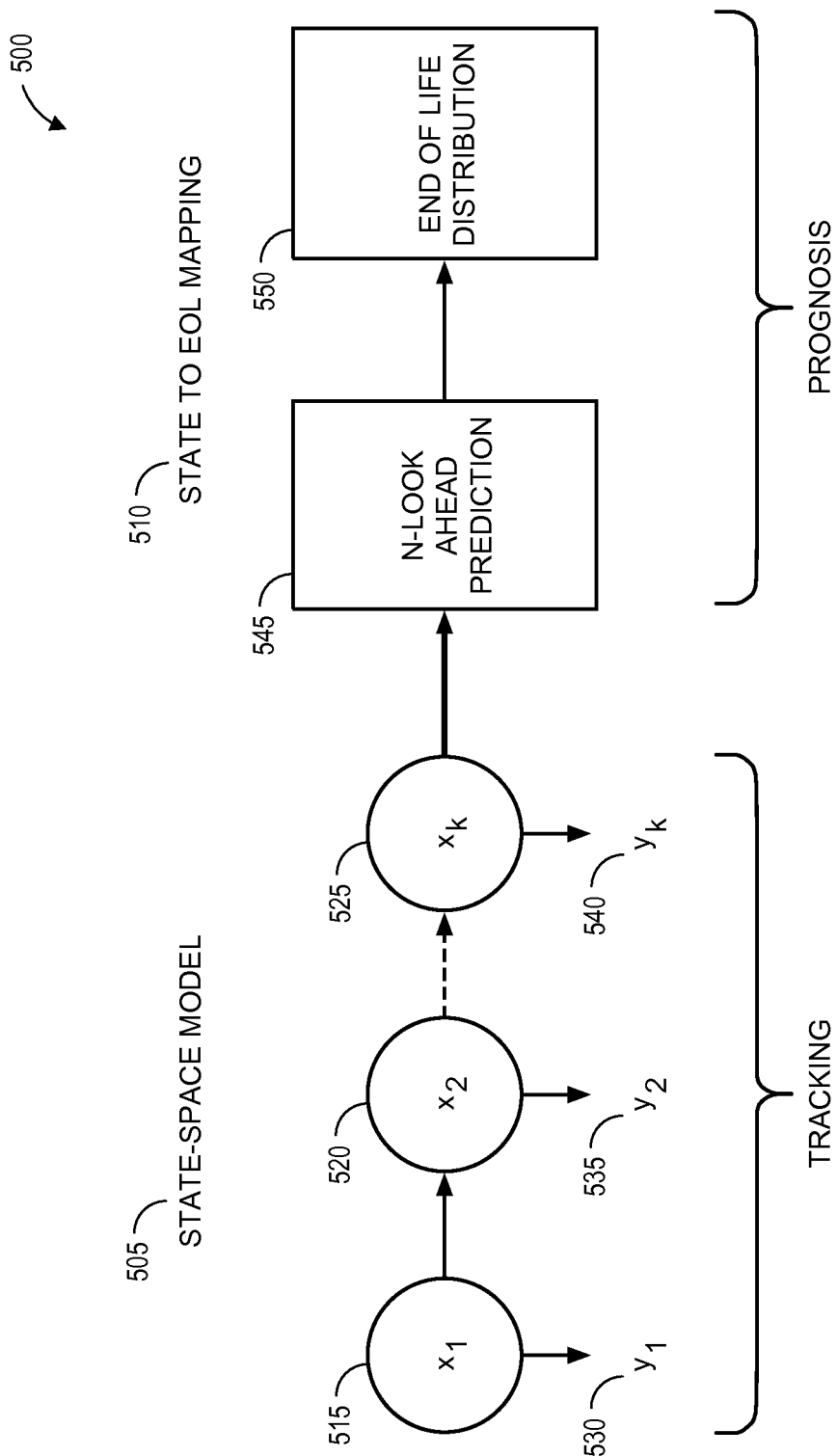
FIG. 5 depicts further details of a method, in accordance with an example embodiment, for conducting a state-to-EOL mapping using the state-space model.

FIG. 5 depicts a flow diagram describing a method 500, in accordance with an example embodiment, for conducting a state-to-EOL mapping 510 using the state-space model. Here, states 515, 520, and so on, up to state 525 ($x_1$, $x_2$, . . . , $x_k$), represent the underlying states or health of an asset at time instants 1, 2, . . . , k, respectively. The states are governed by the state-space model 505. The corresponding measurements at these states are given by 530, 535, and so on up to 540 ($y_1$, $y_2$, . . . , $y_k$). At any instant, say k, long term predictions regarding the state/health of the asset can be made by propagating the states and measurements collected until time k using the state model.

Method 500 is a methodology to obtain long term predictions and the EOL distribution given the state-space model in 455 (FIG. 4). A Bayesian filter is employed to track the state or health of the asset over time. At any given instant when an EOL estimate is called for, aspects of the present disclosure will generate a look-ahead prediction 545 by projecting the current state estimate using the state transition equation. Based on this analysis, an end-of-life distribution 550 can be generated.

FIG. 6 is a diagram depicting the state equation 605 for describing a state of the asset as well as a measurement equation 610 for determining or tracking the current state of the asset in accordance with an example embodiment. The state equation 605 describes the evolution of the state or health of the asset over its cycles of operation. Here, a portion of the state equation 605 is based on a data-driven model derived from empirical data of the industrial asset. Another portion of the state equation 605 is based on an approximated physics-based model. In some cases, the state equation 605 can be a weighted combination of the data-driven model and the approximate physics-based model of the asset. For example, the state equation 605 is a weighted combination of radial basis functions, where the weights in the parameters of the RBFs are estimated using training data about the asset provided by a user. The state equation 605 can be an example of a portion of the state-space model 455 based on block 420 of FIG. 4.

Measurement equation 610 is a function that relates the state of the asset to the sensor observations (or features extracted thereof) at each cycle k, consistent with the measurement functions 530, 535, and 540. Here, a portion of the measurement equation 610 is based on a data-driven model derived from empirical data of the industrial asset. Another portion of the measurement equation 610 is based on an approximated physics-based model. Similar to the state equation 605, the measurement equation 610 can be a weighted combination of the data-driven model and the approximate physics-based model of the asset. The parameters associated with equations 605 and 610 are estimated using the Expectation-Maximization (EM) algorithm.

Figure 7:
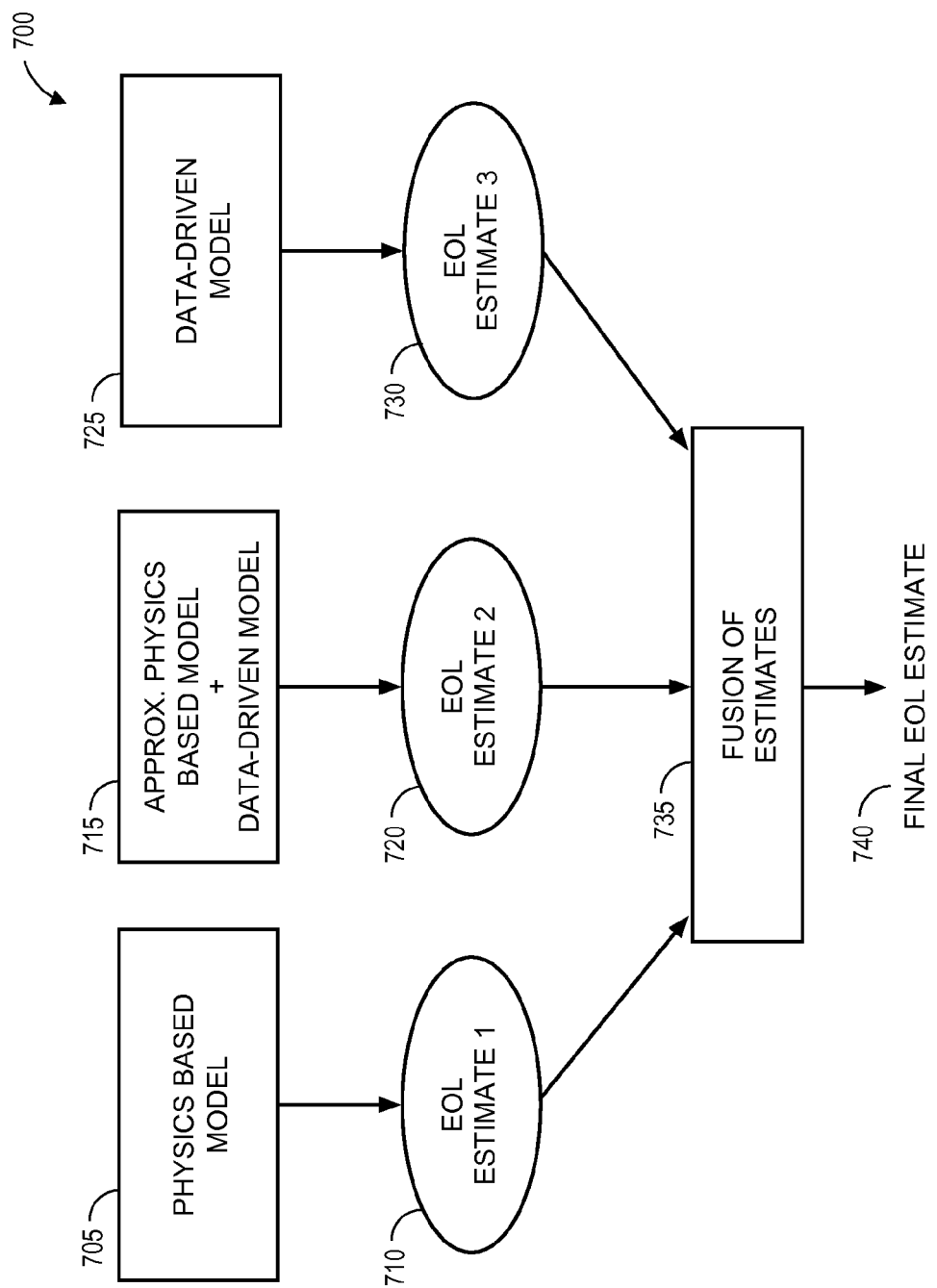
FIG. 7 is a flow diagram illustrating a method, in accordance with another example embodiment, of generating an EOL prediction.

FIG. 7 is a flow diagram illustrating a method 700, in accordance with another example embodiment, of generating an EOL prediction. Here the EOL prediction is based on a fusion of estimates. Similar to the different estimates generated by different models as described in FIG. 4, here, different models 705 (physical based model), 715 (approximate physics based model plus data-driven model), and 725 (data-driven model only) can each produce separate EOL estimates 710, 720, and 730, respectively. The method 700 used to generate the EOL estimates 710, 720, and 730 can be based on the techniques described in FIG. 4, for example. In this case, after each model generates an EOL estimate, the multiple estimates can be fused or merged together at block 735. The fusion of the estimates can be based on taking an average of all estimates, and in other cases taking a weighted average of the estimates, the weights being based on a measure of reliability of each of the estimates. In some cases, the measure of reliability can be based on how much empirical data or training data is available, and how many factors in the physics-based model can be known vs. how many are unknown. The fusion of the estimates at block 735 can then produce the final EOL estimate 740. In some example embodiments, merely two of the three EOL estimates can be combined, for example if the physics-based model 705 is not known completely.

Figure 8:
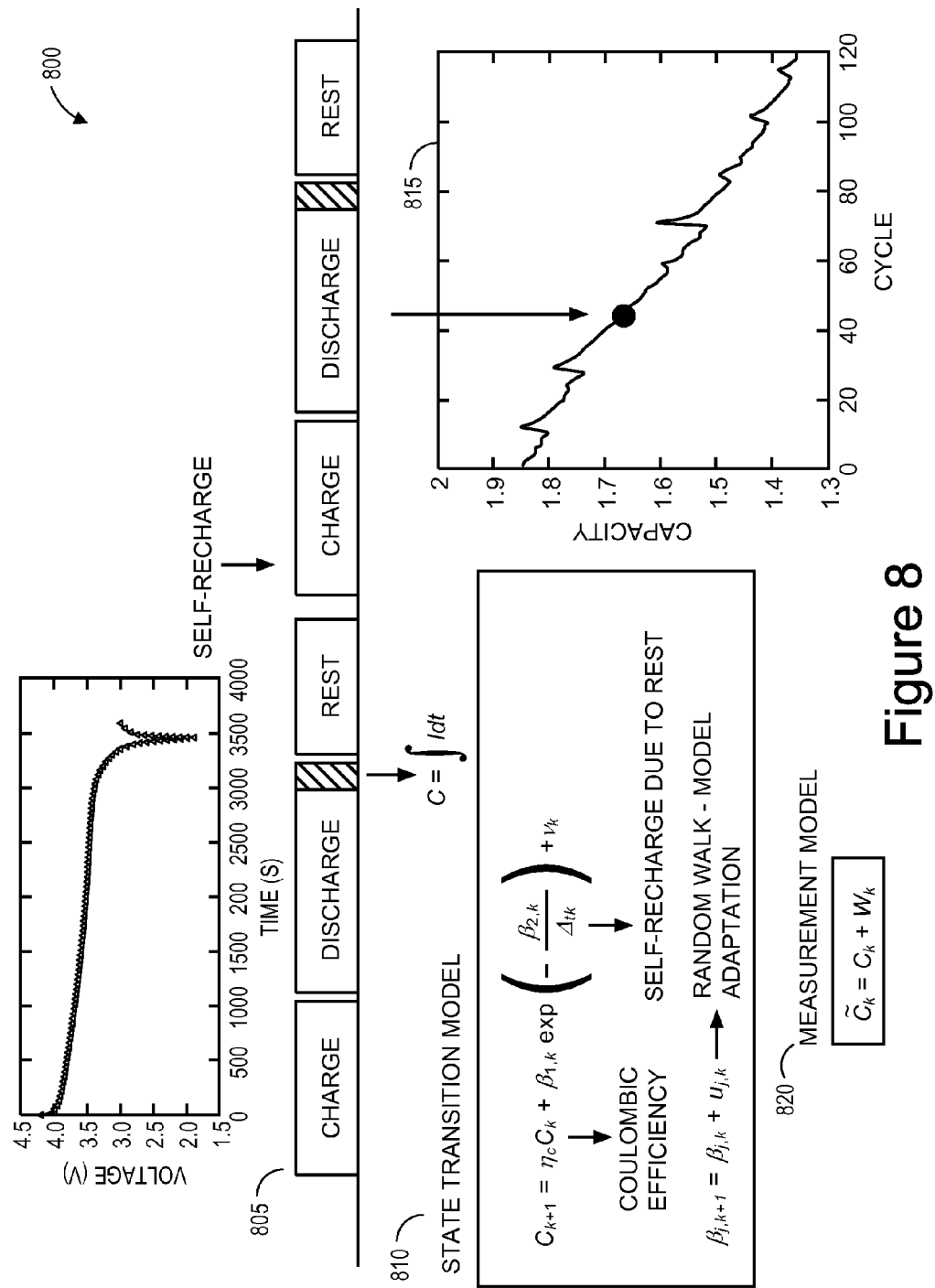
FIG. 8 is a diagram illustrating the application of an example embodiment to a battery prognostics problem.

FIG. 8 is a diagram illustrating a method 800, in accordance with another example embodiment, for producing an EOL estimate, according to some example embodiments. Here, an EOL estimate according to aspects of the present disclosure is generated for a battery. Sequence 805 shows the two cycles of a battery's operation—each cycle comprised of its charging, discharging and a rest condition before the battery is charged again. The capacity of the battery is measured at the end of each discharge cycle. The state transition model 810 as shown is a model that describes the evolution of the capacity of the battery with cycle index, k. The state transition model 810 corresponds to the graph 815 showing training data of the battery. The graph 815 illustrates how the capacity of the battery changes after each cycle of use of the battery. The measurement model 820, in this example, is a noisy version of the battery's capacity.

Figure 9:
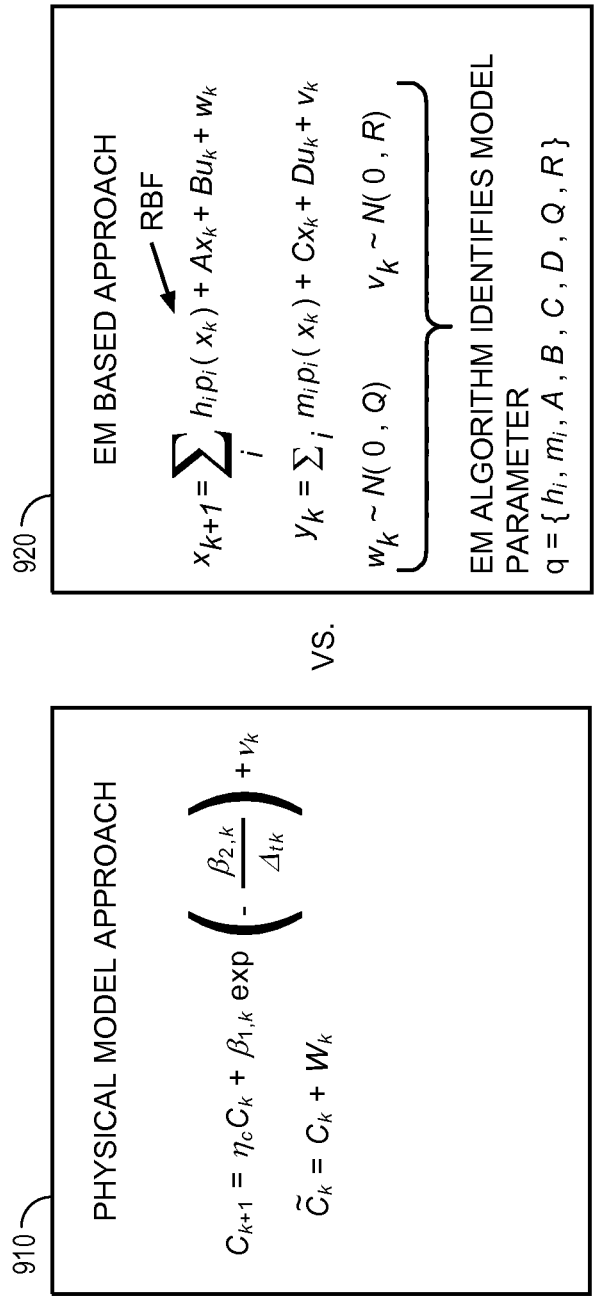
FIG. 9 shows equations that define a state-space model for the capacity of a battery.

FIG. 9 depicts a contrast between two different kinds of models in accordance with an example embodiment. Here, block 910 shows an example set of equations describing a physical model for the battery application, the method being consistent with physics-based models described in FIGS. 6 and 7. In contrast, block 920 shows an example set of equations describing the structure of the state-space model parameters that will be estimated using the available training data using expectation-maximization (EM) methodology. The approach shown in block 920 can be an example of combining the approximated physics-based model with training data, consistent with approaches in blocks 420 and 715. Here, a series of RBFs can be combined with additional parameters from other models, such as the approximated physic-based model, in order to generate a comprehensive model that can be used to predict EOL estimates of an asset. FIG. 9 shows two models—the physics model for the battery capacity example from FIG. 8, and the data-driven model that will be constructed using the available training data. In an example embodiment, the results of these two approaches are compared.

Figure 10:
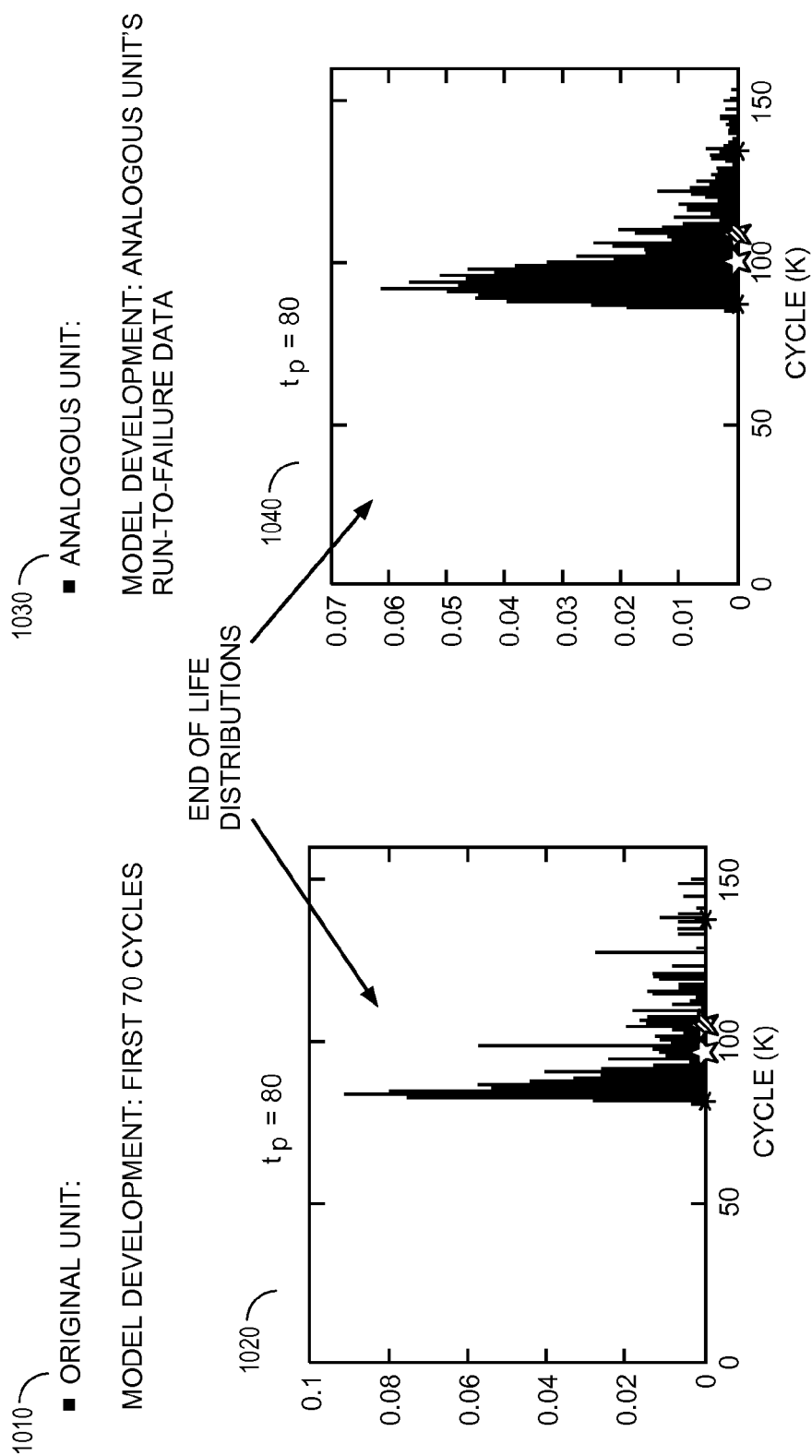
FIG. 10 depicts example graphs depicting the estimated end-of-life distributions when the model learned using data from one unit is applied to the same unit, as well as when applied to an analogous unit in accordance with an example embodiment.

FIG. 10 depicts example graphs 1020, 1040 depicting end-of-life distributions in accordance with an example embodiment. The graphs 1020, 1040 represent EOL distributions for two different but analogous assets. In some example embodiments, EOL predictions can be made for a different asset using a model learned from the original asset's data. In such cases, the model learned from original asset's data is adapted by introducing an addition degree of freedom in the state-space equation. In the battery example, the model adaptation term is a random walk model as given in 810 (FIG. 8). For example, here, an original unit 1010 has associated with it an end-of-life distribution graph 1020. The graph 1020 shows a probability distribution of when the original unit 1010 can stop performing its intended function after a certain number of cycles. Similarly, an analogous unit 1030 has associated with it an end-of-life distribution graph 1040. The graph 1040 shows a probability distribution of when the analogous unit 1030 can stop performing its intended function after a certain number cycles.

FIG. 11 depicts a chart 1110 depicting a comparison of EOL estimates between the original unit 1010 and the analogous unit 1030, in accordance with an example embodiment. The chart 1110 provides an EOL estimate, in number of cycles, based on data-driven modeling of the original unit 1010, data driven modeling of one or more analogous units 1030, and a physics-based model describing the original unit 1010. In addition, the chart 1110 shows the upper and lower 95% confidence interval bounds for these EOL estimates. As shown, the EOL estimates appear to be fairly similar. As such, in some example embodiments, it is possible to adapt the EOL estimate from an original unit to analogous units.

Figure 12:
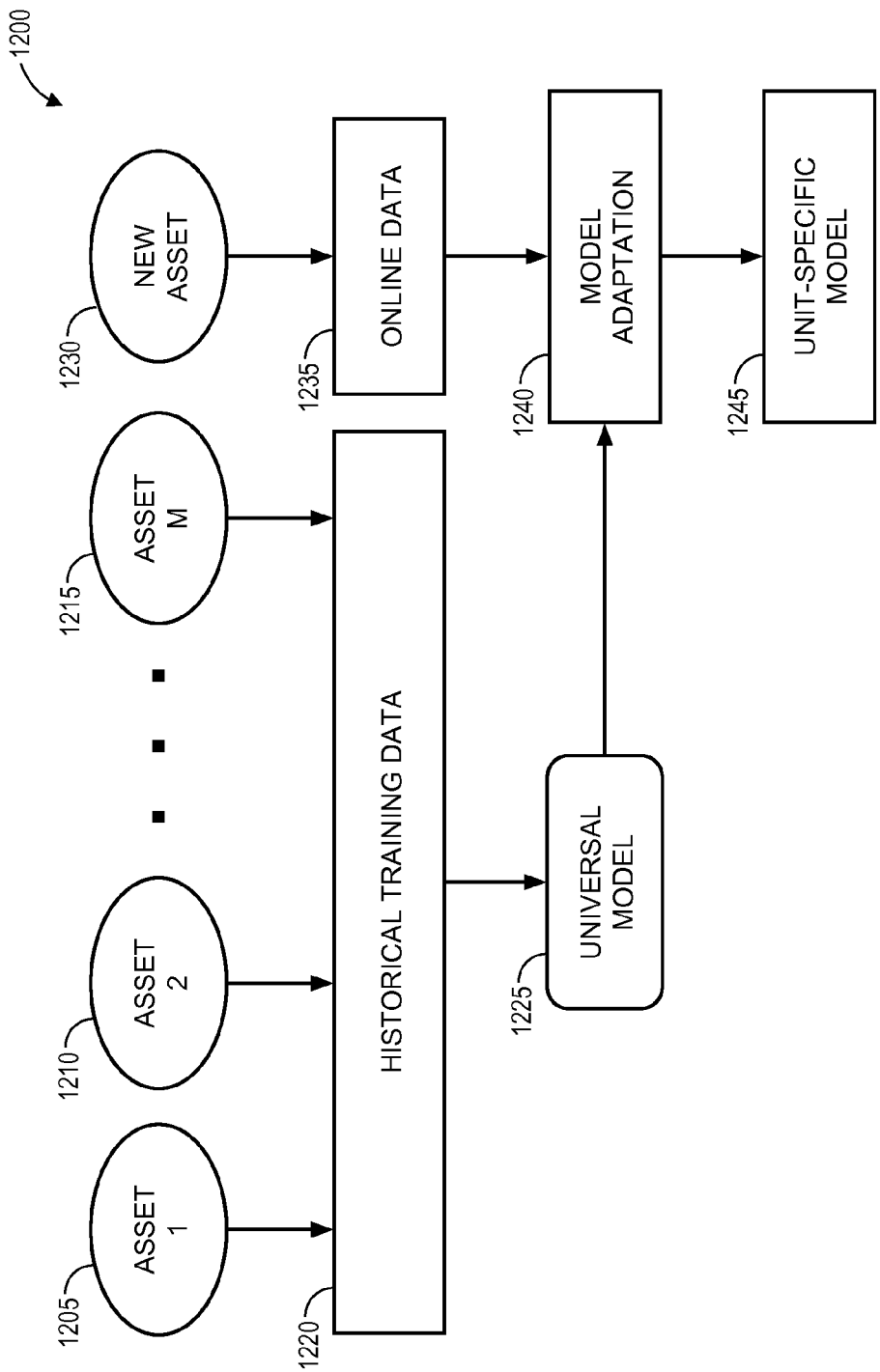
FIG. 12 is a block diagram illustrating a process, in accordance with an example embodiment, for adapting a model from an original asset or set of assets to analogous assets.

FIG. 12 is a block diagram illustrating a process 1200, in accordance with an example embodiment, for adapting a model from an original asset or set of assets to analogous assets. In this example, multiple historical assets, e.g., assets 1205, 1210, and so on to asset 1215 (i.e., asset 1, asset 2, and so on to asset M), can have been monitored and tested to generate historical training data 1220. Out of the aggregate of historical training data 1220 from the multiple assets, a universal model 1225 can be generated. The universal model 1225 can be generated from a complete set of historical training data 1220, or a hybrid of historical training data 1220 and an approximated physics-based model, consistent with the methods described herein. Next, an analogous asset, i.e., new asset 1230, can be modeled based on the historical data of original assets 1205, 1210, 1215. In some cases, online data 1235 can be produced about the new asset 1230. The online data 1235 and the universal model 1225 can be merged to adapt the universal model 1225 to the new asset 1230 in model adaptation block 1240. Out of this, a unit-specific model 1245 for the new asset 1230 can be generated.

In addition to the above capabilities, in some example embodiments, model adaptations can be achieved in an online fashion so that the state-space model is continuously updated to match the dynamics of the specific asset being monitored. This gives a more accurate unit-specific EOL prediction. The model parameters to be adapted are specified as additional states that are tracked, along with the state of health, using a random walk model in the Bayesian filtering framework.

Figure 13:
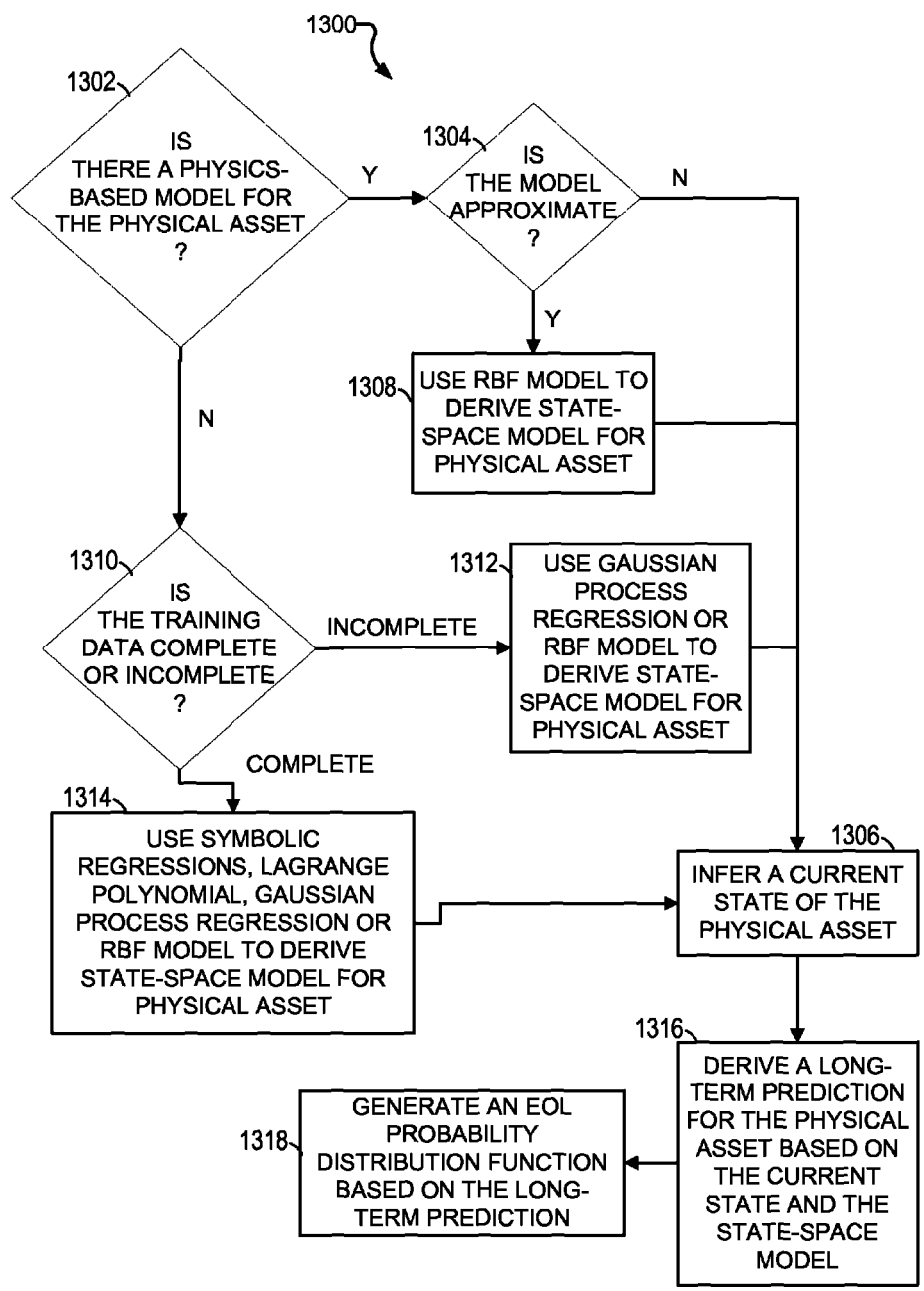
FIG. 13 is a flow diagram illustrating a method, in accordance with an example embodiment, of calculating EOL predictions for a physical asset.

FIG. 13 is a flow diagram illustrating a method 1300, in accordance with an example embodiment, of calculating EOL predictions for a physical asset. At operation 1302, it is determined if there is a physics-based model for the physical asset. If so, then at operation 1304 it is determined if the model is approximate. If not, then the method 1300 already has a state-space model for the physical asset and can proceed to operation 1306. If at operation 1304 it is determined that the model is approximate, then at operation 1308 an RBF model is used to derive a state-space model for the physical asset. Then the method 1300 may proceed to operation 1306.

If at operation 1302 it is determined that there is not a physics-based model for the physical asset, then at operation 1310 it is determined if training data is complete or incomplete. If it is incomplete, then at operation 1312, a state-space model for the physical asset is derived using a Gaussian process regression or an RDF model. If at operation 1310 it is determined that the training data is complete, then at operation 1314, a state-space model for the physical asset is derived using symbolic regressions, a Lagrange polynomial, a Gaussian process regression or an RBF model.

At this point, a state-space model has been obtained; thus at operation 1306 a current state of the physical asset can be inferred. Then at operation 1316, a long-term prediction for the physical asset can be derived based on the current state and the state-space model. Finally, at operation 1318, an EOL probability distribution function can be generated based on the long-term prediction.

Example Mobile Device

Figure 14:
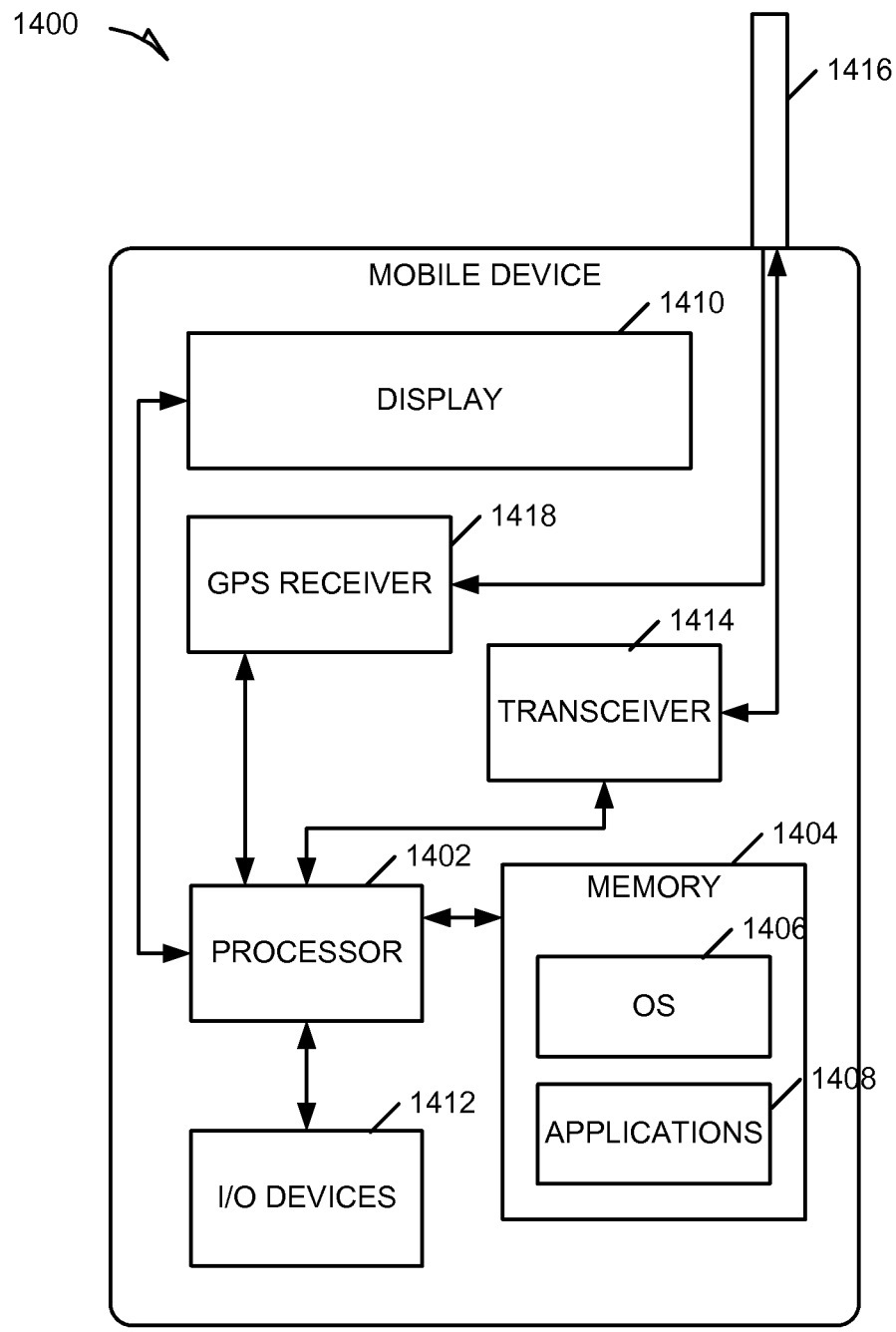
FIG. 14 is a block diagram illustrating a mobile device, according to an example embodiment.

FIG. 14 is a block diagram illustrating a mobile device 1400, according to an example embodiment. The mobile device 1400 can include a processor 1402. The processor 1402 can be any of a variety of different types of commercially available processors suitable for mobile devices 1400 (for example, an XScale architecture microprocessor, a Microprocessor without Interlocked Pipeline Stages (MIPS) architecture processor, or another type of processor). A memory 1404, such as a random access memory (RAM), a Flash memory, or another type of memory, is typically accessible to the processor 1402. The memory 1404 can be adapted to store an operating system (OS) 1406, as well as applications 1408, such as a mobile location enabled application that can provide location based services (LBSs) to a user. The processor 1402 can be coupled, either directly or via appropriate intermediary hardware, to a display 1410 and to one or more input/output (I/O) devices 1412, such as a keypad, a touch panel sensor, a microphone, and the like. Similarly, in some embodiments, the processor 1402 can be coupled to a transceiver 1414 that interfaces with an antenna 1416. The transceiver 1414 can be configured to both transmit and receive cellular network signals, wireless data signals, or other types of signals via the antenna 1416, depending on the nature of the mobile device 1400. Further, in some configurations, a GPS receiver 1418 can also make use of the antenna 1416 to receive GPS signals.

Modules, Components and Logic

Certain embodiments are described herein as including logic or a number of components, modules, or mechanisms. Modules can constitute either software modules (e.g., code embodied (1) on a non-transitory machine-readable medium or (2) in a transmission signal) or hardware-implemented modules. A hardware-implemented module is a tangible unit capable of performing certain operations and can be configured or arranged in a certain manner. In example embodiments, one or more computer systems (e.g., a standalone, client, or server computer system) or one or more processors can be configured by software (e.g., an application or application portion) as a hardware-implemented module that operates to perform certain operations as described herein.

In various embodiments, a hardware-implemented module can be implemented mechanically or electronically. For example, a hardware-implemented module can comprise dedicated circuitry or logic that is permanently configured (e.g., as a special-purpose processor, such as a field programmable gate array (FPGA) or an application-specific integrated circuit (ASIC)) to perform certain operations. A hardware-implemented module can also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) can be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor can be configured as respective different hardware-implemented modules at different times. Software can accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules can be regarded as being communicatively coupled. Where multiple such hardware-implemented modules exist contemporaneously, communications can be achieved through signal transmission (e.g., over appropriate circuits and buses that connect the hardware-implemented modules). In embodiments in which multiple hardware-implemented modules are configured or instantiated at different times, communications between such hardware-implemented modules can be achieved, for example, through the storage and retrieval of information in memory structures to which the multiple hardware-implemented modules have access. For example, one hardware-implemented module can perform an operation and store the output of that operation in a memory device to which it is communicatively coupled. A further hardware-implemented module can then, at a later time, access the memory device to retrieve and process the stored output. Hardware-implemented modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions. The modules referred to herein can, in some example embodiments, comprise processor-implemented modules.

Similarly, the methods described herein can be at least partially processor-implemented. For example, at least some of the operations of a method can be performed by one of processors or processor-implemented modules. The performance of certain of the operations can be distributed among the one or more processors, not only residing within a single machine, but deployed across a number of machines. In some example embodiments, the processor or processors can be located in a single location (e.g., within a home environment, an office environment, or a server farm), while in other embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network (e.g., the Internet) and via one or more appropriate interfaces (e.g., application program interfaces (APIs)).

Electronic Apparatus and System

Example embodiments can be implemented in digital electronic circuitry, in computer hardware, firmware, or software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of description language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors executing a computer program to perform functions by operating on input data and generating output. Method operations can also be performed by, and apparatus of example embodiments can be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine) and software architectures that can be deployed, in various example embodiments.

Example Machine Architecture and Machine-Readable Medium

Figure 15:
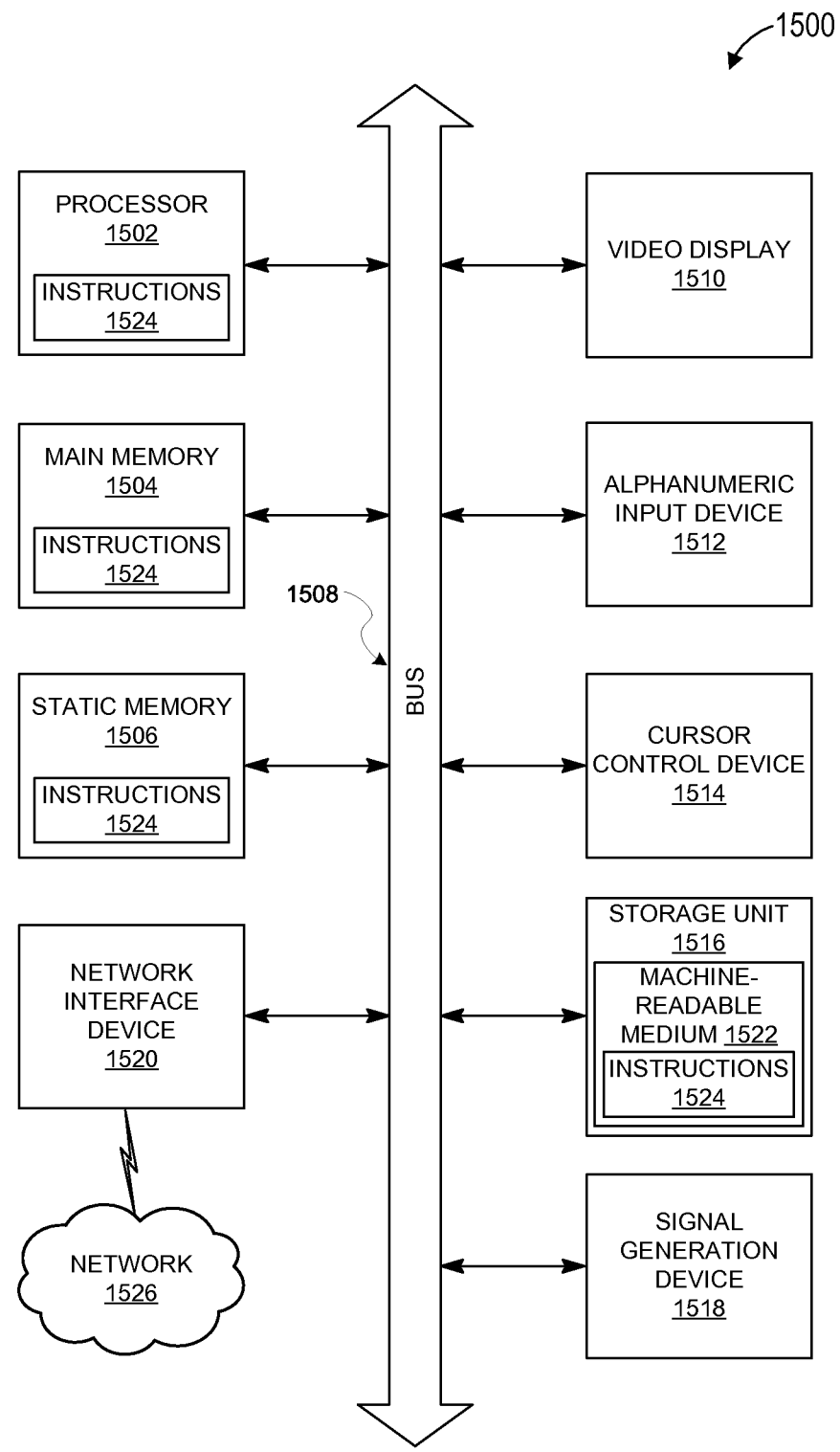
FIG. 15 is a block diagram of a machine in the example form of a computer system within which instructions may be executed to cause the machine to perform any one or more of the methodologies discussed herein.

FIG. 15 is a block diagram of a machine in the example form of a computer system 1500 within which instructions 1524 may be executed to cause the machine to perform any one or more of the methodologies discussed herein. In alternative embodiments, the machine operates as a standalone device or can be connected (e.g., networked) to other machines. In a networked deployment, the machine can operate in the capacity of a server or a client machine in server-client network environment, or as a peer machine in a peer-to-peer (or distributed) network environment. The machine can be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU), or both), a main memory 1504, and a static memory 1506, which communicate with each other via a bus 1508. The computer system 1500 can further include a video display 1510 (e.g., a liquid crystal display (LCD) or a cathode ray tube (CRT)). The computer system 1500 also includes an alpha-numeric input device 1512 (e.g., a keyboard or a touch-sensitive display screen), a user interface (UI) navigation (or cursor control) device 1514 (e.g., a mouse), a storage unit 1516, a signal generation device 1518 (e.g., a speaker), and a network interface device 1520.

Machine-Readable Medium

The disk drive unit 1516 includes a machine-readable medium 1522 on which are stored one or more sets of data structures and instructions 1524 (e.g., software) embodying or utilized by any one or more of the methodologies or functions described herein. The instructions 1524 can also reside, completely or at least partially, within the main memory 1504 and/or within the processor 1502 during execution thereof by the computer system 1500, with the main memory 1504 and the processor 1502 also constituting machine-readable media 1522.

While the machine-readable medium 1522 is shown in an example embodiment to be a single medium, the term "machine-readable medium" can include a single medium or multiple media (e.g., a centralized or distributed database, and/or associated caches and servers) that store the one or more instructions 1524 or data structures. The term "machine-readable medium" shall also be taken to include any tangible medium that is capable of storing, encoding, or carrying instructions 1524 for execution by the machine and that cause the machine to perform any one or more of the methodologies of the present disclosure, or that is capable of storing, encoding, or carrying data structures utilized by or associated with such instructions 1524. The term "machine-readable medium" shall accordingly be taken to include, but not be limited to, solid-state memories, and optical and magnetic media. Specific examples of machine-readable media 1522 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1524 can be transmitted or received over a communication network 1526 using a transmission medium. The instructions 1524 can be transmitted using the network interface device 1520 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1524 for execution by the machine, and includes digital or analog communications signals or other intangible media to facilitate communication of such software.

Although an embodiment has been described with reference to specific example embodiments, it will be evident that various modifications and changes can be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

This written description uses examples to disclose the inventive subject matter, including the best mode, and also to enable any person skilled in the art to practice the inventive subject matter, including making and using any devices or systems and performing any incorporated methods. The patentable scope of the inventive subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of calculating end-of-life (EOL) predictions for a physical asset, the method comprising:
   accessing a state-space model for the physical asset, the state-space model being a physics-based model describing a state of the physical asset at a particular time given measurements or observations for the physical asset;
   inferring a current state of the physical asset;
   deriving a long-term prediction for the physical asset based on the inferred current state of the physical asset and the state-space model for the physical asset; and
   generating an EOL probability distribution function for the physical asset based on the long-term prediction, the EOL probability distribution function describing a range of estimates of EOL for the physical asset and their corresponding confidence intervals.

2. The method of claim 1, wherein the obtaining comprises deriving the state-space model using training data.

3. The method of claim 2, wherein the training data is incomplete and the obtaining further comprises using Gaussian Process Regression to derive the state-space model from the incomplete training data.

4. The method of claim 2, wherein the training data is incomplete and the obtaining further comprises using a Radial basis functions (RBF) model to derive the state-space model from the incomplete training data.

5. The method of claim 2, wherein the training data is complete and the obtaining further comprises using symbolic regression to derive the state-space model from the complete training data.

6. The method of claim 2, wherein the training data is complete and the obtaining further comprises using a Lagrange polynomial to derive the state-space model from the complete training data.

7. The method of claim 2, wherein the training data is complete and the obtaining further comprises using Gaussian Process Regression to derive the state-space model from the complete training data.

8. The method of claim 2, wherein the training data is complete and the obtaining further comprises using a Radial basis functions (RBF) model to derive the state-space model from the complete training data.

9. The method of claim 1, wherein the inferring comprises using calculating a posterior probability distribution function (PDF).

10. The method of claim 1, wherein the inferring comprises using a Kalman filter.

11. The method of claim 1, wherein the inferring comprises using a particle filter.

12. A system comprising:
   a server machine communicatively coupled via a computer network to a device, the server machine comprising one or more processors and configured to:
      access a state-space model for a physical asset, the state-space model being a physics-based model describing a state of the physical asset at a particular time given measurements or observations for the physical asset;
      infer a current state of the physical asset;
      derive a long-term prediction for the physical asset based on the inferred current state of the physical asset and the state-space model for the physical asset; and
      generate an end-of-life (EOL) probability distribution function for the physical asset based on the long-term prediction, the EOL probability distribution function describing a range of estimates of EOL for the physical asset and their corresponding confidence intervals.

13. The system of claim 12, wherein the device is an industrial asset.

14. The system of claim 13, wherein the industrial asset is a gas turbine.

15. A non-transitory computer-readable medium embodying instructions that, when executed by a processor, perform operations comprising:
   accessing a state-space model for a physical asset, the state-space model being a physics-based model describing a state of the physical asset at a particular time given measurements or observations for the physical asset;
   inferring a current state of the physical asset;
   deriving a long-term prediction for the physical asset based on the inferred current state of the physical asset and the state-space model for the physical asset; and
   generating an end-of-life (EOL) probability distribution function for the physical asset based on the long-term prediction, the EOL probability distribution function describing a range of estimates of EOL for the physical asset and their corresponding confidence intervals.

16. The non-transitory computer-readable medium of claim 15, wherein the obtaining the state-space model comprises deriving a state-space model using training data.

17. The non-transitory computer-readable medium of claim 16, wherein the training data is incomplete and the obtaining further comprises using Gaussian Process Regression to derive the state-space model from the incomplete training data.

18. The non-transitory computer-readable medium of claim 16, wherein the training data is incomplete and the obtaining further comprises using a Radial basis functions (RBF) model to derive the state-space model from the incomplete training data.

19. The non-transitory computer-readable medium of claim 16, wherein the training data is complete and the obtaining further comprises using symbolic regression to derive the state-space model from the complete training data.

20. The non-transitory computer-readable medium of claim 16, wherein the training data is complete and the obtaining further comprises using a Lagrange polynomial to derive the state-space model from the complete training data.

* * * * *